Nov. 26, 1935.  R. W. ULLMANN  2,022,640
APPARATUS FOR FORMING AND ORNAMENTING TUBING
Filed Feb. 28, 1933  2 Sheets-Sheet 1

INVENTOR.
Ralph W. Ullmann
BY
Emery, Booth, Varney, Whittemore
ATTORNEYS.

Nov. 26, 1935.                R. W. ULLMANN                2,022,640
                APPARATUS FOR FORMING AND ORNAMENTING TUBING
                    Filed Feb. 28, 1933        2 Sheets-Sheet 2
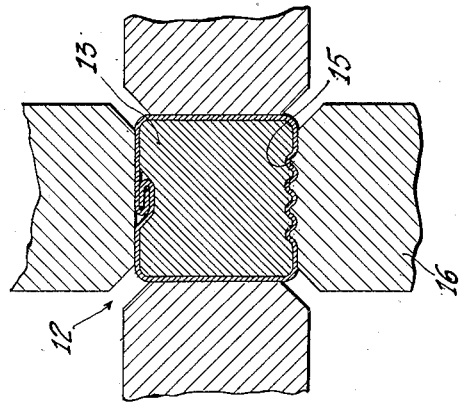
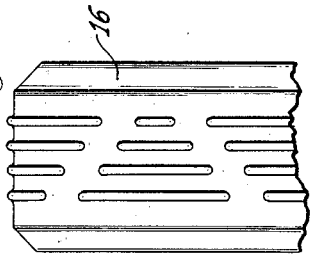
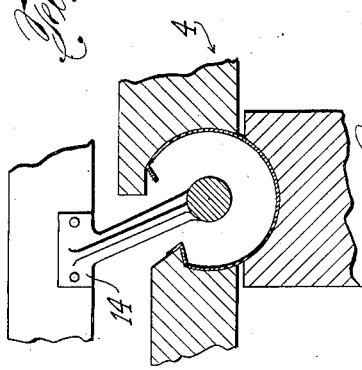
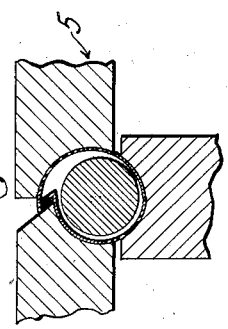
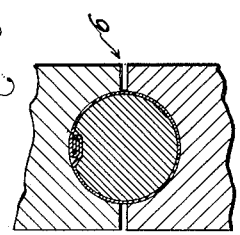
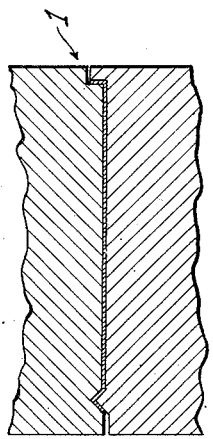
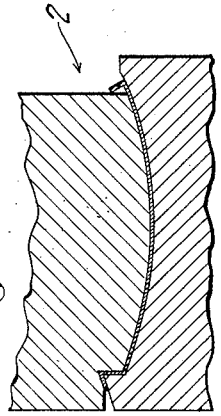
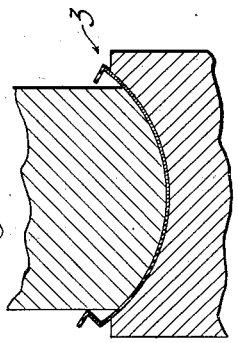
INVENTOR.
Ralph W. Ullmann
BY
Emery, Booth, Varney Whittemore ATTORNEYS.

Patented Nov. 26, 1935

2,022,640

UNITED STATES PATENT OFFICE 2,022,640

APPARATUS FOR FORMING AND ORNAMENTING TUBING

Ralph W. Ullmann, River Forest, Ill., assignor to Revere Copper and Brass Incorporated, New York, N. Y., a corporation of Maryland Application February 28, 1933, Serial No. 658,907

5 Claims. (Cl. 113—33)

This invention relates to apparatus for forming and ornamenting tubing.

It is an object of the invention to provide an apparatus in which tubing may be ornamented as an incident of the tube forming operation, in order that an ornamented tube may be produced in a single operation.

Other objects and advantages of the invention will appear hereinafter.

A preferred embodiment of the invention selected for purposes of illustration is shown in the accompanying drawings, in which, Figure 1 is a front elevation of the apparatus shown in semi-diagrammatic form.

Figure 1:
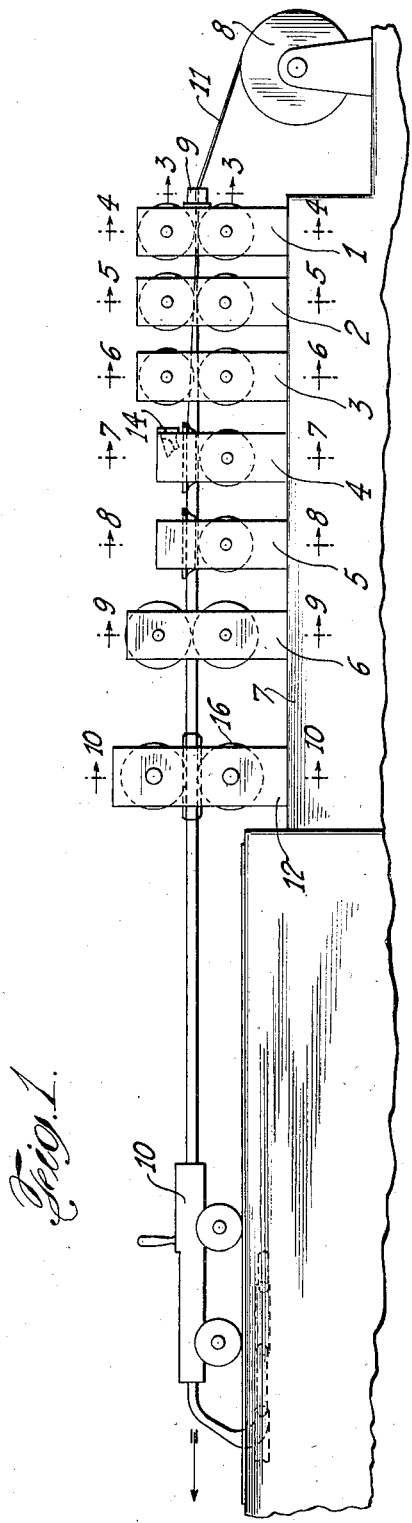
Figure 3:
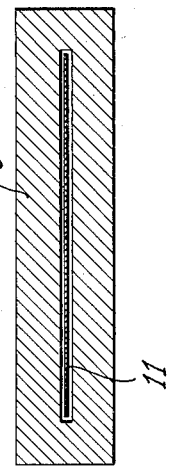
Figure 3 is a section on the line 3—3 of Figure 1 taken through the guide box.

Figures 4, 5, 6, 7, 8, 9 and 10 are sections on the lines 4—4, 5—5, 6—6, 7—7, 8—8, 9—9 and 10—10 of Figure 1 showing the various stages of the forming operation, Figure 4 illustrating the seaming rolls, Figures 5, 6 and 7 the forming rolls, Figures 8 and 9 the seam locking rolls and Figure 10 the shaping and ornamenting rolls. Figure 10 is on an enlarged scale.

Figure 11 is a plan view of one of the ornamenting rolls.

For purposes of illustration, the invention has been shown as applied in the manufacture of lock seam tubing, but it will be understood that the ornamenting feature may be applied to tubing formed in other ways.

Referring to the drawings, the illustrated apparatus for forming the lock seam is of conventional construction and comprises a plurality of sets of forming dies or rollers 1, 2, 3, 4, 5 and 6 mounted in the conventional way on a suitable base or table 7. At one end of the base is placed a reel 8 from which flat metal strip is fed through the guide box 9 to the forming dies or rollers, the stock being drawn through the machine by means of jaws 10 operated in the conventional manner.

As illustrated in Figures 4 to 9 inclusive, the successive dies or rollers shape the flat strip 11 in such manner as to form a cylindrical lock seam tube as illustrated in Figure 9.

Also mounted on the base 7 in such position as to receive the tube as it leaves die 6 is a shaping tool which may for convenience be called a turk's head 12 having a plurality of oppositely disposed rollers adapted to impart the desired shape to the finished tubing, as for example, square, cylindrical or polygonal.

A suitable stationary mandrel 13 is provided, extending between the oppositely disposed faces of the rollers of the turk's head 12, and the said mandrel may be supported in any convenient manner, as for example, by attachment to a suitable fixed support 14 located between the dies 3 and 4 at a point where the tube has not yet been closed.

In order to provide the desired ornamentation, the mandrel 13 may be provided with a groove or series of grooves 15 extending longitudinally of the mandrel. In the embodiment illustrated in the drawings, only one face of the mandrel is grooved, but it will be understood that if it is desired to provide ornamentation on more than one face of the finished tube additional grooves or sets of grooves may be provided at additional places on the mandrel.

Figure 2:
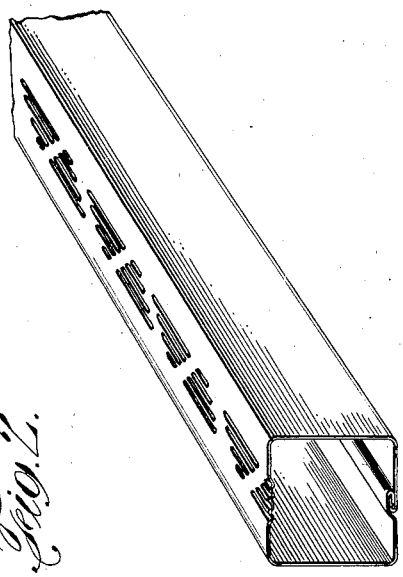
Figure 2 is a perspective view of a piece of finished tubing.

In order to cooperate with the grooves 15 for the purpose of ornamenting the tube, the roller 16 opposite the grooved face of the mandrel is provided with a projection or series of projections mating with the grooves of the mandrel, the said projections and grooves being of such height and depth respectively that as the tube passes through the turk's head, the said projections travel longitudinally along the grooves of the mandrel and bite into the metal, forming an intaglio design or pattern therein. By interrupting or spacing the projections on the roller, as illustrated in Figure 11, an ornamental design, such as illustrated in Figure 2, may be secured, and it will be understood that by suitably arranging the projections on the roller a great variety of designs may be secured.

It will be understood that the invention may be variously modified and embodied within the scope of the subjoined claims.

I claim as my invention:

1. Apparatus for forming and ornamenting lock seam tubing which comprises a series of tube forming dies, a head having rotatably mounted thereon a plurality of of shaping rollers arranged in oppositely disposed pairs, a stationary mandrel extending between said rollers, means to support said mandrel at a station prior to that where the tube is closed, said mandrel being provided with a flat surface having longitudinal continuous grooves therein, one of said rollers being provided with a cooperating flat surface having a plurality of series of peripheral interrupted projections thereon, the projections comprising each series being located opposite one of said grooves and traveling longitudinally thereof as the stock passes through, and means for drawing the stock through said dies and head, whereby as the stock passes through said head it is operated upon by said interrupted projections cooperating with said continuous grooves to form an interrupted embossed design thereon.

2. Apparatus for forming and ornamenting lock seam tubing which comprises a series of tube forming dies, a head having rotatably mounted thereon a plurality of shaping rollers arranged in oppositely disposed pairs, a stationary mandrel extending between said rollers, means to support said mandrel at a station prior to that where the tube is closed, said mandrel being provided with a flat surface having a plurality of longitudinal continuous grooves therein, one of said rollers being provided with a cooperating flat surface having peripheral interrupted projections thereon opposite said grooves and traveling longitudinally thereof as the stock passes through, and means for drawing the stock through said dies and head, whereby as the stock passes through said head it is operated upon by said interrupted projections cooperating with said continuous grooves to form an interrupted embossed design thereon.

3. Apparatus for forming and ornamenting lock seam tubing which comprises a series of tube forming dies, a head having a plurality of shaping rollers, a stationary mandrel extending between said rollers, said mandrel being provided with a flat surface having longitudinal continuous grooves therein, and one of said rollers being provided with a cooperating flat surface having interrupted projections thereon opposite said grooves and traveling longitudinally thereof as the stock passes through, and means for drawing the stock through said dies and head, whereby as the stock passes through said head it is operated upon by said interrupted projections cooperating with said continuous grooves to form an interrupted embossed design thereon.

4. Apparatus for forming ornamented tubing comprising, means for forming a tube, a head arranged to receive the tube from said forming means, a pair of rollers on said head, a stationary mandrel extending between said rollers, said mandrel being provided with a flat surface having a plurality of longitudinal continuous grooves therein, one of said rollers being provided with a cooperating flat surface having a plurality of rows of peripheral interrupted projections thereon opposite said grooves and traveling longitudinally thereof as the stock passes through, and means for drawing the stock through said forming means and head, whereby as the stock passes through said head it is operated upon by said interrupted projections cooperating with said continuous grooves to form an interrupted embossed design thereon.

5. Apparatus for forming ornamented tubing comprising, means for forming a tube, a head arranged to receive the tube from said forming means, a roller on said head, a stationary mandrel cooperating with said roller, said mandrel being provided with a flat surface having a plurality of longitudinal continuous grooves therein, said roller being provided with a cooperating flat surface having peripheral interrupted projections thereon opposite said grooves and traveling longitudinally thereof as the stock passes through, and means for drawing the stock through said forming means and head, whereby as the stock passes through said head it is operated upon by said interrupted projections cooperating with said continuous grooves to form an interrupted embossed design thereon.

RALPH W. ULLMANN.